United States Patent [19]

Shimaoka et al.

[11] Patent Number: 5,164,639
[45] Date of Patent: Nov. 17, 1992

[54] HORIZONTAL DEFLECTION CORRECTING CIRCUIT FOR A TELEVISION RECEIVER

[75] Inventors: Katsuaki Shimaoka; Masataka Muranaka, both of Osaka, Japan

[73] Assignee: Matsushita Electric Industrial Co., Ltd., Osaka, Japan

[21] Appl. No.: 607,425

[22] Filed: Oct. 31, 1990

[30] Foreign Application Priority Data

Nov. 6, 1989 [JP] Japan .................. 1-289699

[51] Int. Cl.⁵ .................. H01J 29/51; G09G 1/04
[52] U.S. Cl. .................. 315/368.18; 315/371
[58] Field of Search .............. 315/368, 371, 368.23, 315/368.18, 368.21

[56] References Cited

U.S. PATENT DOCUMENTS

| | | | |
|---|---|---|---|
| 3,904,918 | 9/1975 | Matsumoto | 315/368 |
| 4,524,307 | 6/1985 | Wahlquist | 315/368 |
| 4,795,946 | 1/1989 | Nishiyama | 315/370 |

FOREIGN PATENT DOCUMENTS

| | | |
|---|---|---|
| 0201110 | 11/1986 | European Pat. Off. |
| 48-86726 | 10/1973 | Japan |
| 53-157628 | 12/1978 | Japan |
| 58-213583 | 12/1983 | Japan |
| 62-254575 | 11/1987 | Japan |
| 8402227 | 6/1984 | PCT Int'l Appl. |
| 2207825 | 2/1989 | United Kingdom |

Primary Examiner—Gregory C. Issing
Attorney, Agent, or Firm—Lowe, Price, LeBlanc & Becker

[57] ABSTRACT

A horizontal deflection correcting circuit for a television receiver having a CRT with a horizontal convergence winding includes a device for generating a corrective current which has opposite polarities during first and second halves of each horizontal period respectively. The corrective current is fed to the horizontal convergence winding to correct a distortion of a reproduced image on the CRT in horizontal linearity.

8 Claims, 4 Drawing Sheets

HORIZONTAL DEFLECTION CORRECTING CIRCUIT FOR A TELEVISION RECEIVER

BACKGROUND OF THE INVENTION

This invention relates to a horizontal deflection correcting circuit for a television receiver.

In general television receivers, a reproduced image on a CRT tends to be distorted in horizontal linearity. For example, in the case of a reproduced image of a cross hatch pattern having equal lattice widths, horizontal lattice widths in edge parts of the reproduced image are greater than horizontal lattice widths in a central part of the reproduced image.

There is a prior art circuit for correcting such a distortion of a reproduced image in horizontal linearity. As will be described later, the prior art circuit has some problems.

SUMMARY OF THE INVENTION

It is an object of this invention to provide an improved horizontal deflection correcting circuit for a television receiver.

A first aspect of this invention provides a horizontal deflection correcting circuit for a television receiver having a CRT with a horizontal convergence winding, the circuit comprising means for generating a corrective current which has opposite polarities during first and second halves of each horizontal period respectively; and means for feeding the corrective current to the horizontal convergence winding to correct a distortion of a reproduced image on the CRT in horizontal linearity.

A second aspect of this invention provides a horizontal deflection correcting circuit for a television receiver having a CRT with a horizontal convergence winding, and a horizontal deflection circuit with an S-shaped correction capacitor, the circuit comprising means for generating a corrective current which has opposite polarities during first and second halves of each horizontal period respectively; and means for feeding the corrective current to the horizontal convergence winding to correct a distortion of a reproduced image on the CRT in horizontal linearity; wherein the capacitor has a predetermined capacitance such that an amount of S-shaped correction by the capacitor is approximately null.

DESCRIPTION OF THE PRIOR ART

Figure 1:
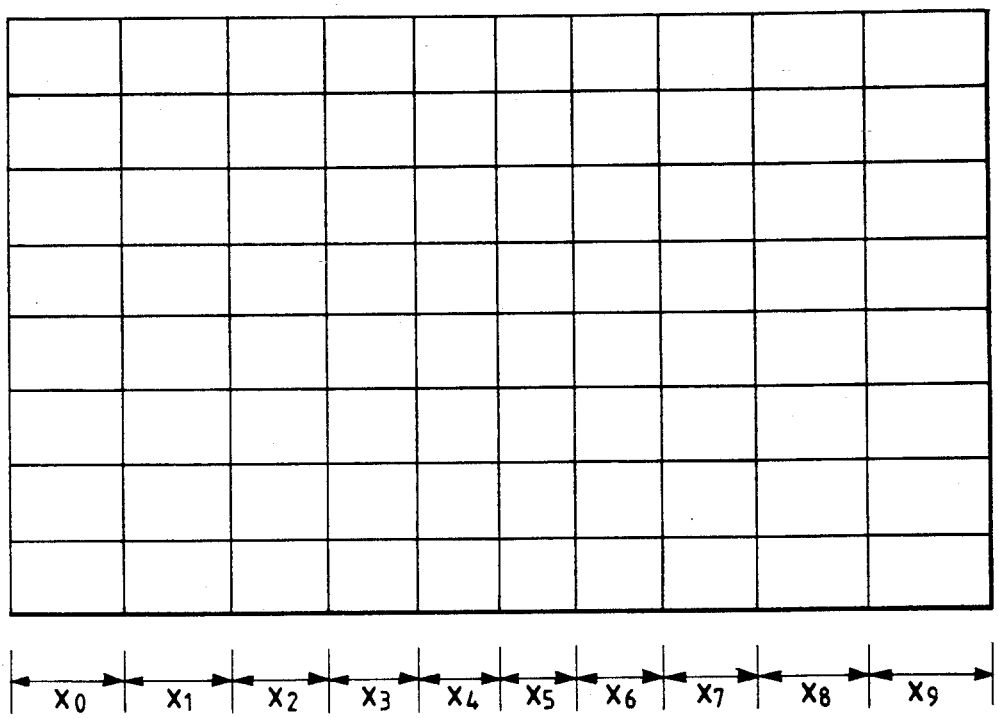
FIG. 1 is a plan view of a reproduced image of a cross hatch pattern in a prior art apparatus.
Figure 2:
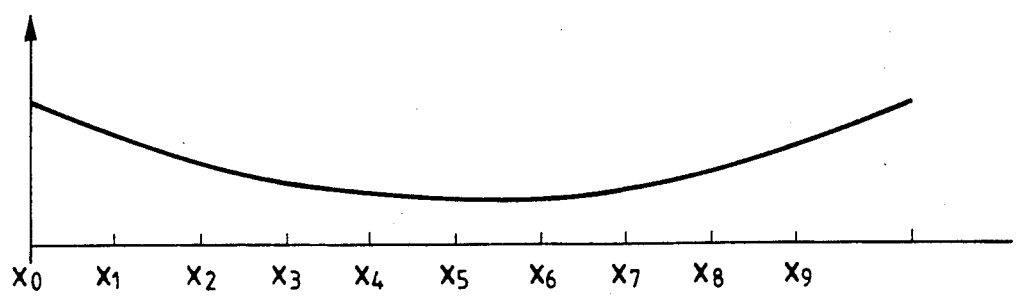
FIG. 2 is a diagram showing the relation between the horizontal lattice width of a part of the image and the position of the part relative to the image in FIG. 1.

In general television receivers, a reproduced image on a CRT tends to be distorted in horizontal linearity. As shown in FIG. 1, in the case of a reproduced image of a cross hatch pattern having equal lattice widths, horizontal lattice widths in edge parts of the reproduced image are greater than horizontal lattice widths in a central part of the reproduced image. The horizontal lattice widths are represented by $x_0$-$x_9$. As shown in FIG. 2, the horizontal lattice width of an image part increases as the part moves from the center to an edge of the reproduced image.

Figure 3:
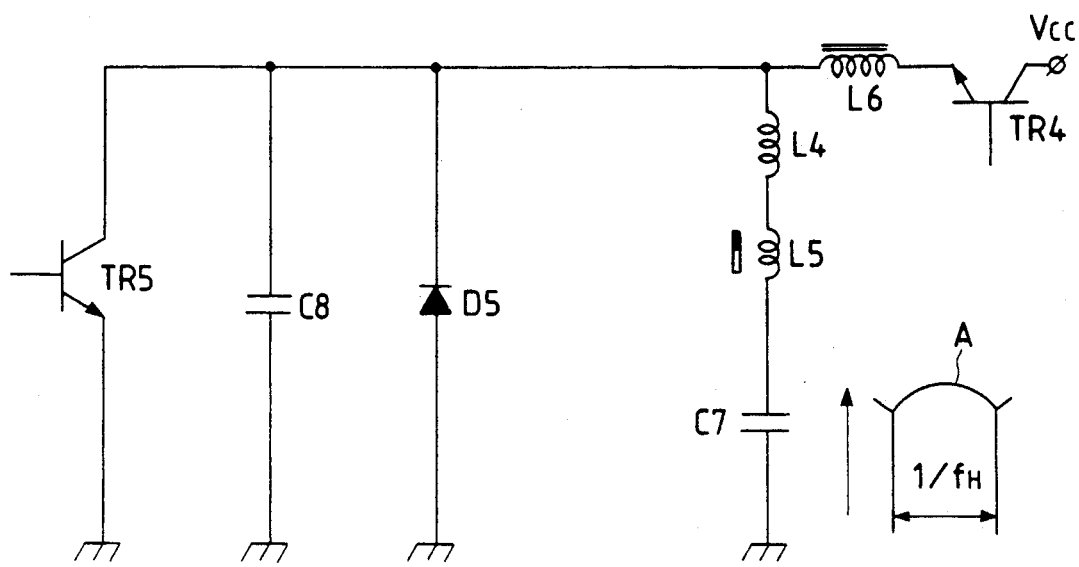
FIG. 3 is a schematic diagram of a prior art horizontal deflection circuit.
Figure 4:
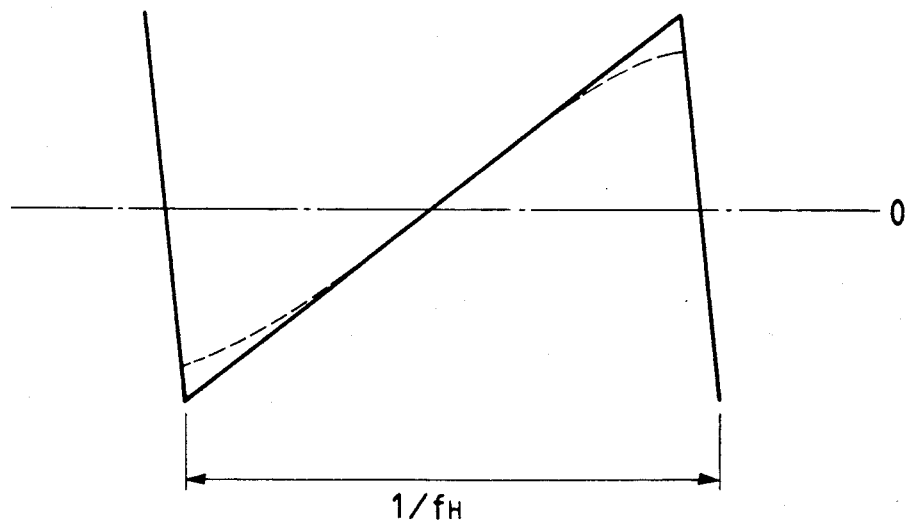
FIG. 4 is a diagram showing the waveform of a horizontal deflection current in the prior art circuit of FIG. 3.

FIG. 3 shows a prior art circuit for correcting such a distortion of a reproduced image in horizontal linearity. As shown in FIG. 3, the prior art circuit is provided in a horizontal deflection circuit having transistors TR4 and TR5, capacitors C7 and C8, a diode D5, and windings L4, L5, and L6. The capacitor C7 serves to enable an S-shaped correction. The capacitance of the capacitor C7 is suitably chosen so that the voltage across the capacitor C7 will have a parabola waveform A having a horizontal scanning period "1/fH". As shown in FIG. 4, a sawtooth horizontal deflection current (represented by the solid lines in FIG. 4) is modulated into an S-shaped waveform (represented by the broken lines in FIG. 4) by the corrective operation of the capacitor C7. This modulation enables an S-shaped correction which compensates a horizontal expansion of edge parts of a reproduced image.

In the prior art correcting circuit of FIG. 3, the amplitude of the parabola-waveform voltage across the corrective capacitor C7 varies with the horizontal deflection frequency. Accordingly, in the prior art correcting circuit of FIG. 3, suitable correction can not be maintained regardless of a change in the horizontal deflection frequency.

In the prior art correcting circuit of FIG. 3, when the horizontal deflection frequency is equal to 31.5 kHz or higher (such a high frequency is required in a high-definition television system), the capacitance of the corrective capacitor C7 needs to be 1 μF or less so that the corrective capacitor C7 is decreased in ability of feeding energy to horizontal deflection. In this case, the horizontal-period ripple current which flows through the transistor TR4 increases, and the load current from the voltage source $V_{cc}$ increases so that the electric power consumed by the horizontal deflection circuit rises.

DESCRIPTION OF THE FIRST PREFERRD EMBODIMENT

Figure 5:
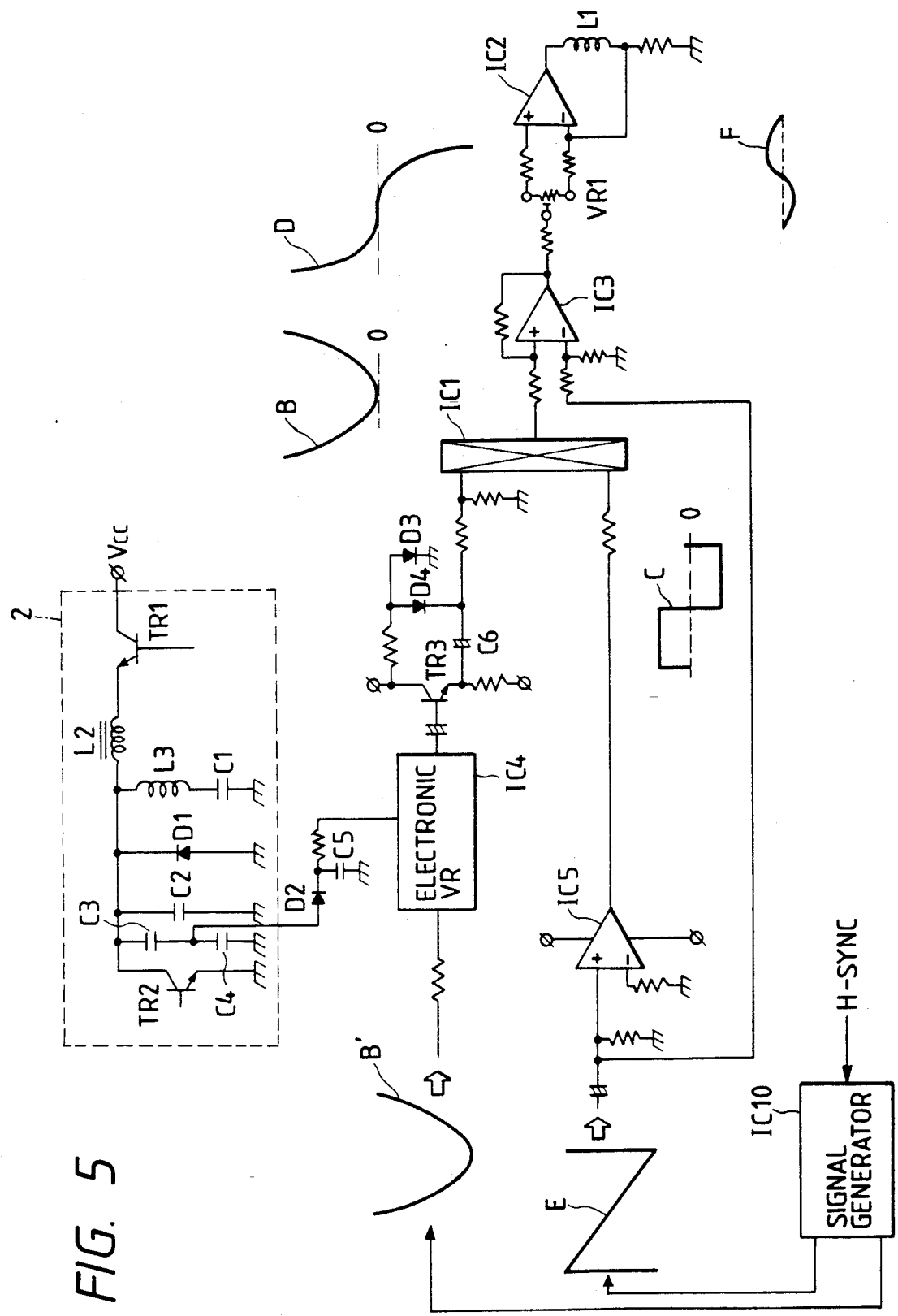
FIG. 5 is a diagram of a horizontal deflection correcting circuit according to a first embodiment of this invention.

With reference to FIG. 5, a horizontal deflection circuit 2 includes a horizontal deflection regulator transistor TR1, a horizontal deflection output transistor TR2, a horizontal deflection choke winding L2, a horizontal deflection winding L3, an S-shaped correction capacitor C1, resonant capacitors C2, C3, and C4, and a diode D1.

The horizontal deflection circuit 2 generates horizontal pulses which are induced between the collector and the emitter of the transistor TR2. The generated horizontal pulses are divided by a series combination of the capacitors C3 and C4 which is connected between the collector and the emitter of the transistor TR2. The horizontal pulses are applied from the junction between the capacitors C3 and C4 to a combination of a diode D2, a capacitor C5, and a resistor (no reference character), being integrated and converted into a dc voltage by the combination of the diode D2, the capacitor C5, and the resistor. The combination of the diode D2, the capacitor C5, and the resistor forms an integrator so that the level of the obtained dc voltage is proportional to the height of the horizontal pulses. As will be described later, the level of the obtained dc voltage is made independent of the frequency of the horizontal pulses. The dc voltage is applied to an electronic potentiometer (variable resistor) IC4 as a control voltage.

In the horizontal deflection circuit 2, the capacitor C2, the diode D1, and a series combination of the winding L3 and the corrective capacitor C1 are connected between the collector and the emitter of the transistor TR2. The emitter of the transistor TR1 is connected to the collector of the transistor TR2 via the winding L2. The collector of the transistor TR1 is subjected to a drive voltage Vcc.

The drive voltage Vcc is transmitted to the collector of the transistor TR2 via the transistor TR1 and the winding L2 so that the drive voltage Vcc determines the height of the horizontal pulses inputted into the integrator composed of the diode 2, the capacitor C5, and the resistor. The drive voltage Vcc is adjusted in accordance with the horizontal frequency by a known circuit (not shown) so that the level of the dc voltage outputted from the integrator can be independent of the horizontal frequency.

The capacitance of the corrective capacitor C1 is 10 $\mu$F or larger so that an amount of horizontal-deflection S-shaped correction given by the corrective capacitor C1 will be approximately null. Accordingly, in the absence in other correction, an amount of distortion of a reproduced image in horizontal linearity is independent of the horizontal frequency and is dependent on only the horizontal width of a raster or the amplitude of the image in a horizontal direction.

A signal generator IC10 outputs a basic parabola wave B' and a sawtooth wave E in response to a horizontal sync pulse signal. The basic parabola wave B', the sawtooth wave E, and the horizontal sync pulse signal are synchronous with each other. The basic parabola wave B' and the sawtooth wave E have predetermined amplitudes independent of the horizontal frequency. The signal generator IC10 can be a commercially-available IC chip.

The basic parabola wave B' is fed to the electronic potentiometer IC4, and is converted by the electronic potentiometer IC4 into a corresponding parabola wave whose amplitude depends on the level of the control voltage, that is, the height of the horizontal pulses generated by the horizontal deflection circuit 2. Since the height of the horizontal pulses is approximately proportional to the amplitude of the horizontal deflection current, the amplitude of the parabola wave outputted from the electronic potentiometer IC4 varies with the horizontal width of the raster (the horizontal image amplitude). Since the amplitude of the basic parabola wave B' and the level of the control voltage are independent of the horizontal frequency, the amplitude of the output parabola wave from the electronic potentiometer IC4 is also independent of the horizontal frequency.

The output parabola wave from the electronic potentiometer IC4 is converted into a first horizontal parabola wave B by a combination of a transistor TR3, diodes D3 and D4, and a capacitor C6 which clamps a bottom part of the input parabola wave to zero. The first horizontal parabola wave B is applied to a first input terminal of a multiplier IC1. The amplitude of the first horizontal parabola wave B varies with the horizontal width of the raster (the horizontal image amplitude). The amplitude of the first horizontal parabola wave B is independent of the horizontal frequency.

The sawtooth wave E is fed to a comparator or a wave shaper IC5, and is converted by the device IC5 into a rectangular wave C. During the first half of each horizontal period, the polarity (sign) of the rectangular wave C is positive. During the second half of each horizontal period, the polarity (sign) of the rectangular wave C is negative. The amplitude of the rectangular wave C is independent of the horizontal frequency. The rectangular wave C is applied to a second input terminal of the multiplier IC1.

The multiplier IC1 multiplies the first horizontal parabola wave B and the rectangular wave C, thereby generating a second horizontal parabola wave D which agrees with the product of the first horizontal parabola wave B and the rectangular wave C. During the first half of each horizontal period, the polarity (sign) of the second horizontal parabola wave D is positive. During the second half of each horizontal period, the polarity (sign) of the second horizontal parabola wave D is negative. The amplitude of the second horizontal parabola wave D varies with the horizontal width of the raster (the horizontal image amplitude). The amplitude of the second horizontal parabola wave D is independent of the horizontal frequency.

The second horizontal parabola wave D is applied to a first input terminal of a differential amplifier IC3. The sawtooth wave E is fed to a second input terminal of the differential amplifier IC3. The differential amplifier IC3 generates a difference between the second horizontal parabola wave D and the sawtooth wave E which agrees with a third horizontal parabola wave F. During the first half of each horizontal period, the polarity (sign) of the third horizontal parabola wave F is negative. During the second half of each horizontal period, the polarity (sign) of the third horizontal parabola wave F is positive. The amplitude of the third horizontal parabola wave F varies with the horizontal width of the raster (the horizontal image amplitude). The amplitude of the third horizontal parabola wave F is independent of the horizontal frequency.

The third horizontal parabola wave F is fed to a differential amplifier IC2 via a potentiometer or a variable resistor VR1. The third horizontal parabola wave F is converted by the differential amplifier IC2 into a corresponding corrective current. The output terminal of the differential amplifier IC2 is connected to a horizontal convergence winding L1 associated with a CRT (not shown), so that the corrective current flows through the horizontal convergence winding L1. During the first half of each horizontal period, the polarity (sign) of the corrective current is negative. During the second half of each horizontal period, the polarity (sign) of the corrective current is positive. The level of the corrective current varies with the horizontal width of the raster (the horizontal image amplitude). The level of the corrective current is independent of the horizontal frequency.

The corrective current flowing through the horizontal convergence winding L1 enables correction of a distortion of a reproduced image in horizontal linearity. The degree of the correction depends on the level of the corrective current. Since the level of the corrective current depends on the horizontal width of the raster (the horizontal image amplitude), appropriate correction of the distortion of the reproduced image in horizontal linearity can be maintained regardless of a change in the horizontal size of the raster. In addition, since the level of the corrective current is independent of the horizontal frequency, the appropriate correction of the distortion can be ensured regardless of a change in the horizontal frequency. Furthermore, since the level of the corrective current can be adjusted by the variable resistor VR1, the degree of the correction can be adjusted by the variable resistor VR1.

DESCRIPTION OF THE SECOND PREFERRED EMBODIMENT

Figure 6:
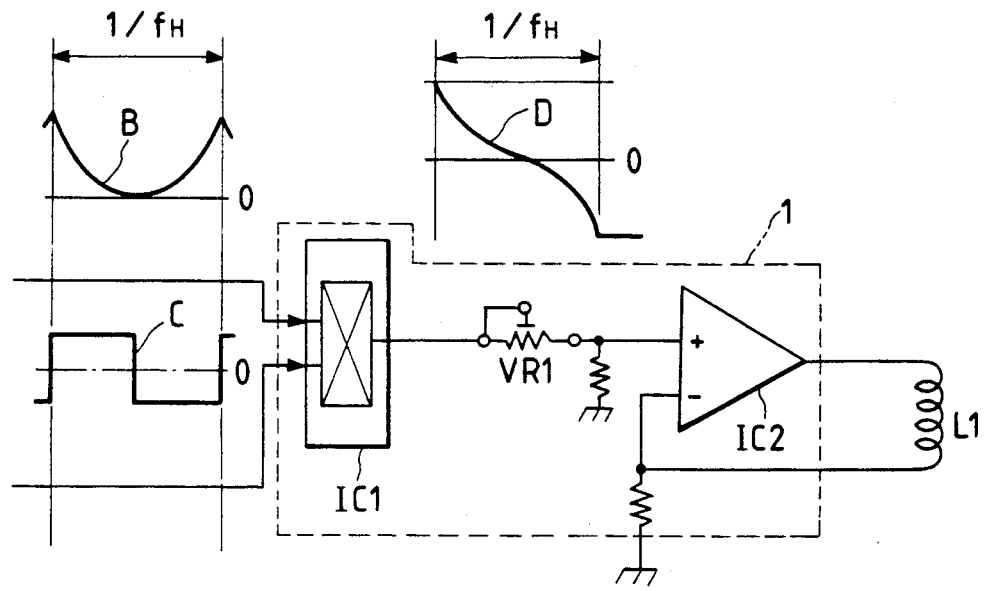
FIG. 6 is a diagram of a part of a horizontal deflection correcting circuit according to a second embodiment of this invention.

FIG. 6 shows a second embodiment of this invention which is similar to the embodiment of FIG. 5 except for the following design change. In the embodiment of FIG. 6, a differential amplifier IC3 (see FIG. 5) is removed, and a second horizontal parabola wave D is fed from a multiplier IC1 to a differential amplifier IC2 via a variable resistor VR1. The second horizontal parabola wave D is converted by the differential amplifier IC2 into a corresponding corrective current which flows through a horizontal convergence winding L1. The corrective current flowing through the horizontal convergence winding L1 enables correction of a distortion of a reproduced image in horizontal linearity. The degree of the correction can be adjusted by the variable resistor VR1.

DESCRIPTION OF THE THIRD PREFERRED EMBODIMENT

Figure 7:
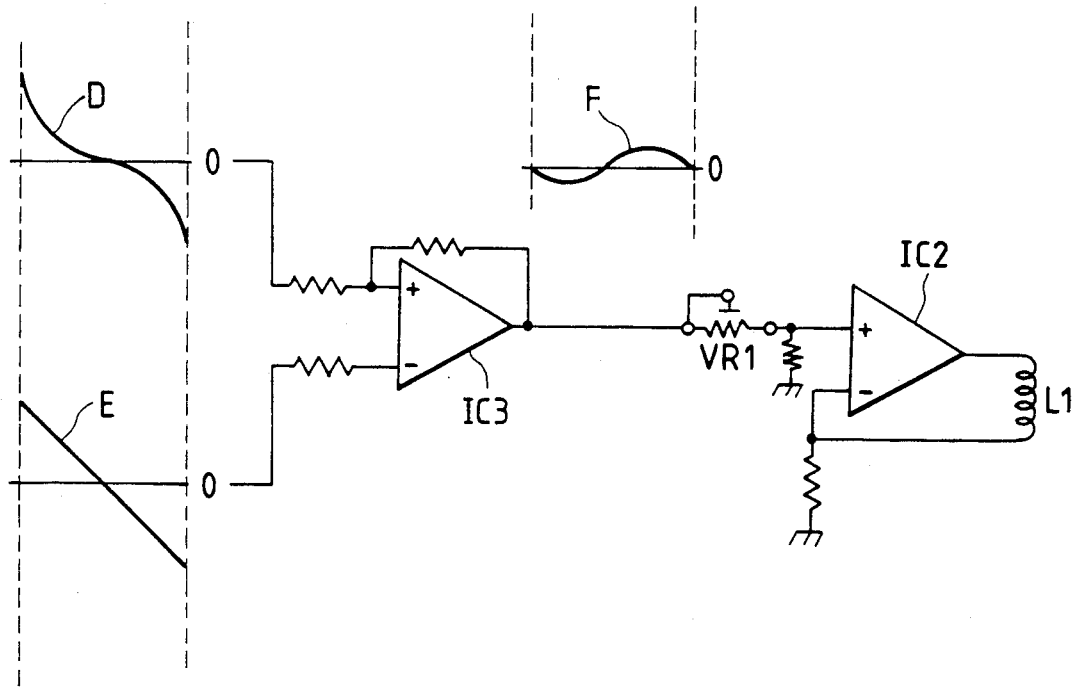
FIG. 7 is a diagram of a part of a horizontal deflection correcting circuit according to a third embodiment of this invention.

FIG. 7 shows a third embodiment of this invention which is similar to the embodiment of FIG. 5 except that the connection among a differential amplifier IC3, a variable resistor VR1, and a differential amplifier IC2 is modified.

What is claimed is:

1. A horizontal deflection correcting circuit for a television receiver having a CRT with a horizontal convergence winding, the circuit comprising:
    means for generating a corrective current which has opposite polarities during first and second halves of each horizontal period respectively and which has parabolic waveforms during the first and second halves of each horizontal period respectively; and
    means for feeding the corrective current to the horizontal convergence winding to correct a distortion of a reproduced image on the CRT in horizontal linearity.

2. A horizontal deflection correcting circuit for a television receiver having a CRT with a horizontal convergence winding, the circuit comprising:
    means for generating a corrective current which has opposite polarities during first and second halves of each horizontal period respectively; and
    means for feeding the corrective current to the horizontal convergence winding to correct a distortion of a reproduced image on the CRT in horizontal linearity,
    wherein the generating means comprises:
    means for generating a first horizontal parabola wave;
    means for generating a rectangular wave which has opposite polarities during the first and second halves of each horizontal period respectively;
    means for multiplying the first horizontal parabola wave and the rectangular wave, and generating a second horizontal parabola wave which agrees with a product of the first horizontal parabola wave and the rectangular wave and which has opposite polarities during the first and second halves of each horizontal period respectively; and
    means for converting the second horizontal parabola wave into the corrective current.

3. A horizontal deflection correcting circuit for a television receiver having a CRT with a horizontal convergence winding, the circuit comprising:
    means for generating a corrective current which has opposite polarities during first and second halves of each horizontal period respectively; and
    means for feeding the corrective current to the horizontal convergence winding to correct a distortion of a reproduced image on the CRT in horizontal linearity,
    wherein the generating means comprises:
    means for generating a first horizontal parabola wave;
    means for generating a rectangular wave which has opposite polarities during the first and second halves of each horizontal period respectively;
    means for multiplying the first horizontal parabola wave and the rectangular wave, and generating a second horizontal parabola wave which agrees with a product of the first horizontal parabola wave and the rectangular wave and which has opposite polarities during the first and second halves of each horizontal period respectively;
    means for generating a horizontal sawtooth wave;
    means for generating a third horizontal parabola wave which agrees with a difference between the second horizontal parabola wave and the horizontal sawtooth wave and which has opposite polarities during the first and second halves of each horizontal period respectively; and
    means for converting the third horizontal parabola wave into the corrective current.

4. A horizontal deflection correcting circuit for a television receiver having a CRT with a horizontal convergence winding, the circuit comprising:
    means for generating a corrective current which has opposite polarities during first and second halves of each horizontal period respectively;
    means for feeding the corrective current to the horizontal convergence winding to correct a distortion of a reproduced image on the CRT in horizontal linearity;
    means for generating a control signal which depends on a horizontal size of a raster on the CRT; and
    means for controlling a level of the corrective current in response to the control signal to adjust the level of the corrective current in accordance with the horizontal size of the raster on the CRT.

5. A horizontal deflection correcting circuit for a television receiver having a CRT with a horizontal convergence winding, and a horizontal deflection circuit with an S-shaped correction capacitor, the circuit comprising:
    means for generating a corrective current which has opposite polarities during first and second halves of each horizontal period respectively and which has parabolic waveforms during the first and second halves of each horizontal period respectively; and means for feeding the corrective current to the horizontal convergence winding to correct a distortion of a reproduced image on the CRT in horizontal linearity;

wherein the capacitor has a predetermined capacitance such that an amount of S-shaped correction by the capacitor is approximately null.

6. A horizontal deflection correcting circuit for a television receiver having a CRT with a horizontal convergence winding, and a horizontal deflection circuit with an S-shaped correction capacitor, the circuit comprising:

means for generating a corrective current which has opposite polarities during first and second halves of each horizontal period respectively; and means for feeding the corrective current to the horizontal convergence winding to correct a distortion of a reproduced image on the CRT in horizontal linearity;

wherein the capacitor has a predetermined capacitance such that an amount of S-shaped correction by the capacitor is approximately null, and wherein the generating means comprises:

means for generating a first horizontal parabola wave;

means for generating a rectangular wave which has opposite polarities during the first and second halves of each horizontal period respectively;

means for multiplying the first horizontal parabola wave and the rectangular wave, and generating a second horizontal parabola wave which agrees with a product of the first horizontal parabola wave and the rectangular wave and which has opposite polarities during the first and second halves of such horizontal period respectively; and means for converting the second horizontal parabola wave into the corrective current.

7. A horizontal deflection correcting circuit for a television receiver having a CRT with a horizontal convergence winding, and a horizontal deflection circuit with an S-shaped correction capacitor, the circuit comprising:

means for generating a corrective current which has opposite polarities during first and second halves of each horizontal period respectively; and means for feeding the corrective current to the horizontal converqence winding to correct a distortion of a reproduced image on the CRT in horizontal linearity;

wherein the capacitor has a predetermined capacitance such that an amount of S-shaped correction by the capacitor is approximately null, and wherein the generating means comprises:

means for generating a first horizontal parabola wave;

means for generating a rectangular wave which has opposite polarities during the first and second halves of each horizontal period respectively;

means for multiplying the first horizontal parabola wave and the rectangular wave, and generating a second horizontal parabola wave which agrees with a product of the first horizontal parabola wave and the rectangular wave and which has opposite polarities during the first and second halves of each horizontal period respectively;

means for generating a horizontal sawtooth wave;

means for generating a third horizontal parabola wave which agrees with a difference between the second horizontal parabola wave and the horizontal sawtooth wave and which has opposite polarities during the first and second halves of each horizontal period respectively; and means for converting the third horizontal parabola wave into the corrective current.

8. A horizontal deflection correcting circuit for a television receiver having a CRT with a horizontal convergence winding, and a horizontal deflection circuit with an S-shaped correction capacitor, wherein the capacitor has a predetermined capacitance such that an amount of S-shaped correction by the capacitor is approximately null, the circuit comprising:

means for generating a corrective current which has opposite polarities during first and second halves of each horizontal period respectively;

means for feeding the corrective current to the horizontal convergence winding to correct a distortion of a reproduced image on the CRT in horizontal linearity;

means for generating a control signal which depends on a horizontal size of a raster on the CRT; and means for controlling a level of the corrective current in response to the control signal to adjust the level of the corrective current in accordance with the horizontal size of the raster on the CRT.

* * * * *